United States Patent [19]

Macrander et al.

[11] 3,903,379

[45] Sept. 2, 1975

[54] CROSSPOINT NETWORK PULL AND ALARM CIRCUIT

[75] Inventors: Max S. Macrander, Warrenville; Ronald F. Kowalik, Lombard, both of Ill.

[73] Assignee: GTE Automatic Electric Laboratories Incorporated, Northlake, Ill.

[22] Filed: Feb. 28, 1974

[21] Appl. No.: 446,863

[52] U.S. Cl........ 179/175.2 C; 179/16 AA; 307/234

[51] Int. Cl.$^{2}$........................................... H04M 3/22

[58] Field of Search...............179/175.2 A, 175.2 C, 175.2 R, 179/18 GF, 18 GE, 16 AA, 16 A; 328/111; 307/234

[56] References Cited

UNITED STATES PATENTS

| | | | |
|---|---|---|---|
| 3,093,756 | 7/1963 | Rywak | 328/111 |
| 3,392,374 | 7/1968 | Grace | 328/111 |
| 3,403,269 | 9/1968 | Thompson | 307/234 |
| 3,421,021 | 1/1969 | Britt | 307/234 |
| 3,500,369 | 3/1970 | Kellam, Jr. | 307/234 |
| 3,654,517 | 4/1972 | Mahoney et al. | 307/234 |

*Primary Examiner*—Kathleen H. Claffy
*Assistant Examiner*—Randall P. Myers

[57] ABSTRACT

A pulse width monitor for a telephone communication network is responsive to the duration of the network path marking pulses to provide an indication when the duration of one of the path marking pulses exceeds a predetermined duration and also terminates the marking pulses of excessive duration after the predetermined time has elapsed. As a result, faulty path marking circuits are more readily located and erroneous and multiple cross-connections are prevented.

8 Claims, 2 Drawing Figures

CROSSPOINT NETWORK PULL AND ALARM CIRCUIT

BACKGROUND OF THE INVENTION

The present invention is directed in general to a pulse width monitor and more particularly to a path marking pulse width monitor for use in a telephone communication network.

Telephone communication networks usually include a multiplicity of matrixed transmission paths between any two network endpoints and marking circuits for selecting unique transmission paths from the matrix of possible transmission paths. The marking circuits are commonly arranged to apply pull or marking pulses to the desired path to selectively establish the unique transmission path for use. The marking pulses are generally of relatively short duration, for once a unique transmission path is established and in use it will remain operative until its use is terminated at its endpoints.

However, should the marking pulses be sustained indefinitely, depending upon the network topography, many subscribers could be denied service. In addition, continuous marking pulses randomly located in the network can cause faulty or multiple cross-connections during subsequent path selection processes.

Accordingly, it is therefore a general object of the present invention to provide a path marking pulse width monitor for a telephone communication network.

It is a more particular object of the present invention to provide a path marking pulse width monitor for a telephone communication network which detects marking pulses having durations longer than a predetermined time duration and which provides an indication of the path marking pulses of excessive duration.

It is a still further object of the present invention to provide a path marking pulse width monitor which terminates the path marking pulses of excessive duration after a predetermined time has elapsed to prevent faulty or multiple cross-connections during the subsequent path selecting processes.

In general, the present invention provides a path marking pulse width monitor for use in a telephone communication network of the type wherein unique transmission paths are selected from a matrix of possible transmission paths by marking pulses provided by path marking means. The path marking pulse width monitor comprises pulse duration detecting means coupled to the marking means and responsive to a finite duration of the marking pulses for providing an output control signal and indicating means coupled to the detecting means for indicating the presence of the pulse having a duration exceeding the predetermined time duration in response to the control signal.

BRIEF DESCRIPTION OF THE DRAWINGS

The invention, together with further objects and advantages thereof, may best be understood by reference to the following description taken in connection with the accompanying drawings, in the several figures of which like reference numerals identify like elements, and in which.

DESCRIPTION OF THE PREFERRED EMBODIMENT

Figure 1:
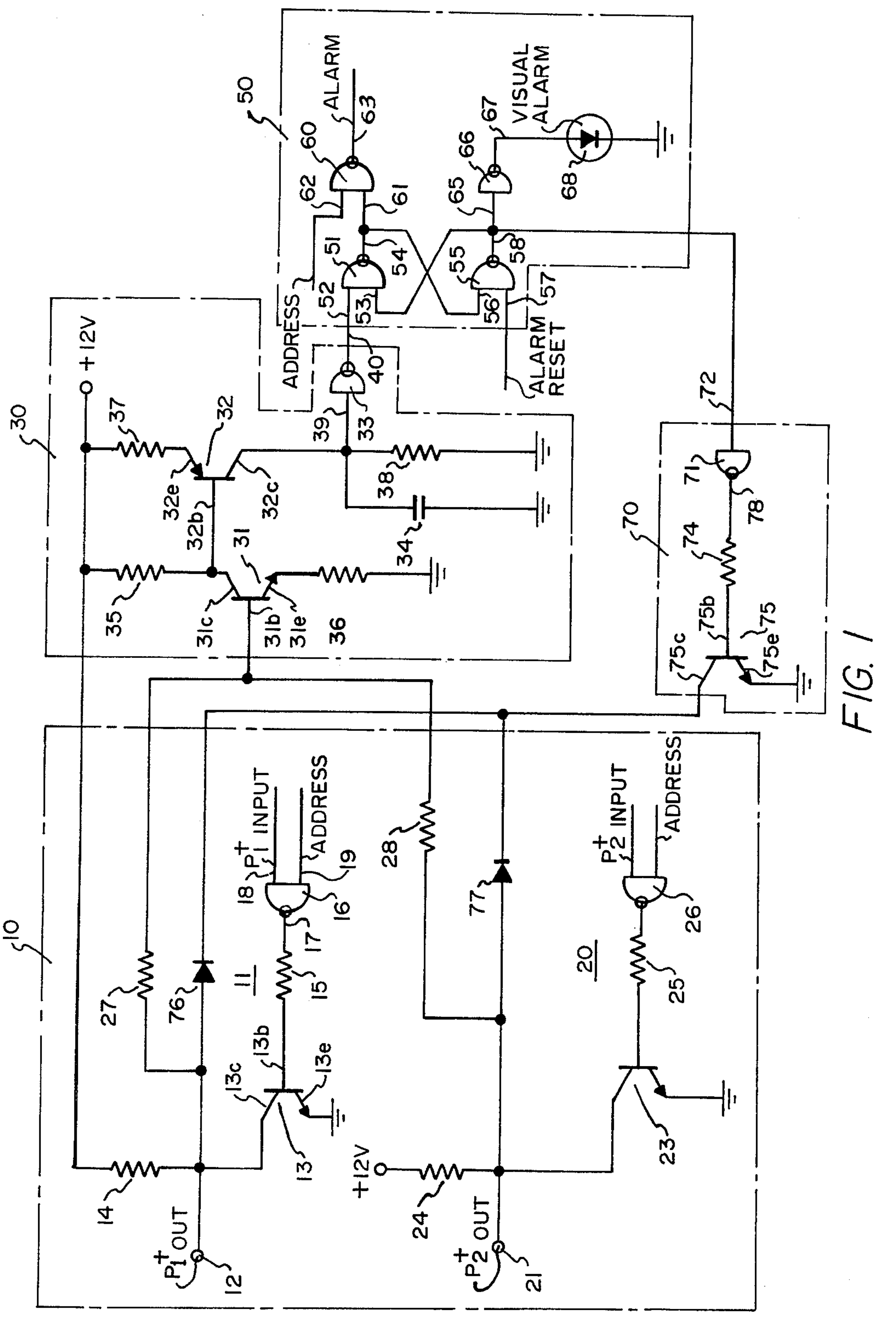
FIG. 1 is a schematic circuit diagram of a path marking means and associated path marking pulse width monitor embodying the present invention.

Referring now to the drawings, FIG. 1 shows transmission path marking means 10 and marking pulse width monitor comprising detecting means 30, indicating means 50 and marking pulse terminating means 70. Marking means 10 comprises a plurality of pull driver circuits 11 and 20 having output terminals 12 and 21 respectively. Only two such pull driver circuits are shown in FIG. 1 but it is to be understood that any number of pull driver circuits may be incorporated into marking means 10.

At output terminals 12, 21, the pull driver circuits of marking means 10 provide path marking pulses for selecting unique transmission paths from the matrix of possible transmission paths in the telephone communication entwork in which it is incorporated.

Pull driver circuit 11 comprises transistor 13, resistor 14, resistor 15 and NAND gate 16. Transistor 13 has emitter **13*e* coupled to ground, collector 13*c* coupled to output terminal 12 and base 13*b* coupled to output 17 of NAND gate 16 by resistor 15. Resistor 14 couples the output terminal 12 and collector 13*c* of transistor 13 to a +12 volt power source. NAND gate 16 has an input 19 coupled to the addressing circuits of the telephone communication network to receive address signals which select the particular pull driver circuit to be utilized in establishing a unique transmission path within the telephone communication network. Input 18 of NAND gate 16** is coupled to timing circuitry within the telephone communication network to receive P input or timing input pulses which determine when the selected pull driver circuit is to establish the unique transmission path.

Pull driver circuit 20 comprises transistor 23, resistor 24, resistor 25 and NAND gate 26. As can be seen from the drawing, pull driver circuit 20 is identical to pull driver circuit 11.

When a transmission path is to be selected, a pull driver circuit associated with the selected transmission path provides a marking pulse which is of a relatively short duration. Once the unique transmission path is established, it will remain operative until its use is terminated. Therefore, the marking pulses are only active for a short period of time in order to select the unique transmission path. Typically, the pulse duration of the marking pulses may be on the order of 600 nanoseconds. For example, if a transmission path associated with output terminal 12 of pull driver circuit 11 is to be selected, the network will provide at input 19 of NAND gate 16 an address signal designating pull driver circuit 11 as the pull driver circuit to be utilized in establishing the desired connection. For this embodiment, the address signal applied to input 19 is represented by a high level logic signal. After the address signal is established at input 19, the network provides at input 18 a timing signal also represented by a high level which causes output 17 of NAND gate 16 to assume a low level state. The low level state at output 17 causes transistor 13 to be back biased and turns off transistor 13. Therefore, a +12 volt pulse will appear at output terminal 12 and be utilized to establish the unique transmission path within the network. After the unique transmission path has been established, which usually requires 2 microseconds to achieve, the network removes the timing signal applied to input 18 and then removes the address signal applied to input 19 of NAND gate 16. In doing so, output 17 will assume a high level which will turn on transistor 13 and bring output terminal 12 back to approximately ground potential. As previously mentioned, all of this occurs within a time period of approximately 2 microseconds.

Once the transmission path is established, it will remain operative until its use is terminated. However, should there be a malfunction in the network resulting in sustained timing and address inputs at inputs 18 and 19 of NAND gate 16, transistor 13 will remain off and the marking pulse will continue to be applied to output terminal 12. Because more than one subscriber may be associated with the transmission path associated with output terminal 12, a sustained marking pulse at output terminal 12 could deny many subscribers service or result in faulty or multiple cross-connections during subsequent transmission path selections. To minimize the effects of this obviously undesirable condition, marking means 10 is coupled to pulse width detecting means 30 which is responsive to the duration of the marking pulses and detects those pulses which are of a duration longer than a predetermined time duration.

Detecting means 30 comprises transistor 31, transistor 32, NAND gate 33, capacitor 34 and resistors 35, 36, 37 and 38. Detecting means 30 is coupled to the output terminals 12 and 21 by resistors 27 and 28 respectively at base 31*b* of transistor 31. Transistor 31 has collector 31*c* coupled to the +12 volt power source by resistor 35 and emitter 31e coupled to ground by resistor 36. Transistor 32 additionally has its emitter 32*e* coupled to the +12 volt power source by resistor 37 and collector 32*c* coupled to ground by the parallel combination of capacitor 34 and resistor 38. The junction of capacitor 34 and resistor 38 is coupled to input 39 of NAND gate 33.

The detecting means 30 at output 40 of NAND gate 33 is coupled to indicating means 50 at input 52 of NAND gate 51. The output 54 of NAND gate 51 is coupled to input 56 of NAND gate 55 and to input 61 of NAND gate 60. NAND gate 51 has another input 53 coupled to the output 58 of NAND gate 55. The interconnections of NAND gates 51 and 55 are well known in the art as a latching circuit. Input 62 of NAND gate 60 is coupled to the portion of the telephone network which generates addressing signals of the type used to address the pull driver circuits of marking means 10, the purpose of which will be discussed subsequently. Input 57 of NAND gate 55 is a reset input for resetting the indicating means. Output 58 of NAND gate 55 is also coupled to input 65 of NAND gate 66. NAND gate 66 has output 67 coupled to a light emitting diode 68 which provides a visual indication of a marking pulse of excessive duration.

The pulse width monitor additionally includes a marking pulse terminating means 70 which comprises NAND gate 71, resistor 74 and transistor 75. Input 72 of NAND gate 71 is coupled to the indicating means at output 58 of NAND gate 55 and the output of NAND gate 71 is coupled to resistor 74. Resistor 74 is in turn coupled to base 75*b* of transistor 75. The emitter 75*e* of transistor 75 is coupled to ground and the collector 75*c* is coupled to the output terminals 12 and 21 of marking means 10 by diodes 76 and 77 respectively.

In operation, assuming that a transmission path associated with output terminal 12 of pull driver 11 is to be selected, the timing and address signals at inputs 18 and 19 of NAND gate 16 initially cause transistor 13 to be conductive. This places output terminal 12 at approximately ground potential. When pull driver circuit 11 is selected, input 19 of NAND gate 16 receives a high level address signal. Shortly thereafter, input 18 receives a high level timing signal which causes output 17 to attain a low level causing transistor 13 to be nonconductive. Terminal 12 of pull driver circuit 11 will therefore be at a positive 12 volts. When a transmission path has been established approximately 600 nanoseconds later, a low level timing signal is applied to input 18 of NAND gate 16 and shortly thereafter a low level address signal is applied to input 19 to cause output 17 of NAND gate 16 to go high. The high level at output 17 in turn causes transistor 13 to conduct to terminate the path marking pulse at terminal 12.

If for some reason there had been a malfunction in either the timing signals or the address signals, or if transistor 13 had become defective, terminal 12 would remain at the +12 volt level. As previously mentioned, this condition can cause faulty path selection and depending upon the telephone communication network topography could result in a number of subscribers being denied service. In order to minimize this effect, the path marking pulse at terminal 12 is impressed upon base 31*b* of transistor 31 of detecting means 30. This causes transistor 31 to conduct and by virtue of being coupled at its collector 31*c* to base 32*b* of transistor 32, transistor 32 will likewise conduct current. The current conducted by transistor 32 charges capacitor 34 for a predetermined time duration until the voltage at the junction of capacitor 34 and resistor 38 reaches a high level. This high level is applied to input 39 of NAND gate 33 forcing output 40 of NAND gate 33 to attain a low level control signal. The low level at NAND gate 40 is supplied to input 52 of NAND gate 51 and forces output 54 high. Because output 54 is coupled to input 56 of NAND gate 55, and because input 57 is normally at a high level, output 58 of NAND gate 55 will go low. The low output at output 58 is impressed on input 65 of NAND gate 66 which causes output 67 to go high thus supplying current to light emitting diode 68 to provide a visual indication of the marking pulse of excessive duration. Because output 58 of NAND gate 55 is also coupled to input 53 of NAND gate 51, the interaction of NAND gate 51 and 55 acts as a latch to sustain the visual alarm.

The low output at output 58 of NAND gate 55 is additionally impressed upon input 72 of NAND gate 71 of path marking pulse terminating means 70. The low level at input 72 causes the output 78 of NAND gate 71 to go high turning on transistor 75. The turning on of transistor 75 provides a path through diode 76 to ground for output terminal 12. There, fore, the positive 12 volt output at output terminal 12 will be terminated thus terminating the path marking pulse. Because the pulse terminating means is coupled to the indicating means 50 at NAND gate 55, the path marking pulse of excessive duration is terminated after the predetermined time duration has elapsed in response to the control signal at output 40 of NAND gate 33 of detecting means 30.

Even though transistor 75 causes output terminal 12 to be approximately at ground, because NAND gates 51 and 55 are coupled to form a latching circuit, the visual alarm at light emitting diode 68 will be sustained. After servicing has been completed to correct the problem causing the sustained path marking pulse, a resetting low level input may be applied to input 57 of NAND gate 55 to reset the indicating means.

When the visual indication occurs at light emitting diode 68, an address signal may be applied to input 62 of NAND gate 60 to provide a logical output signal at output 63 of NAND gate 60 for use in locating the faulty pull driver circuit. The address signal applied to input 62 is contemplated to be from the same source of address signals as applied to the inputs of the pull driver NAND gates.

Figure 2:
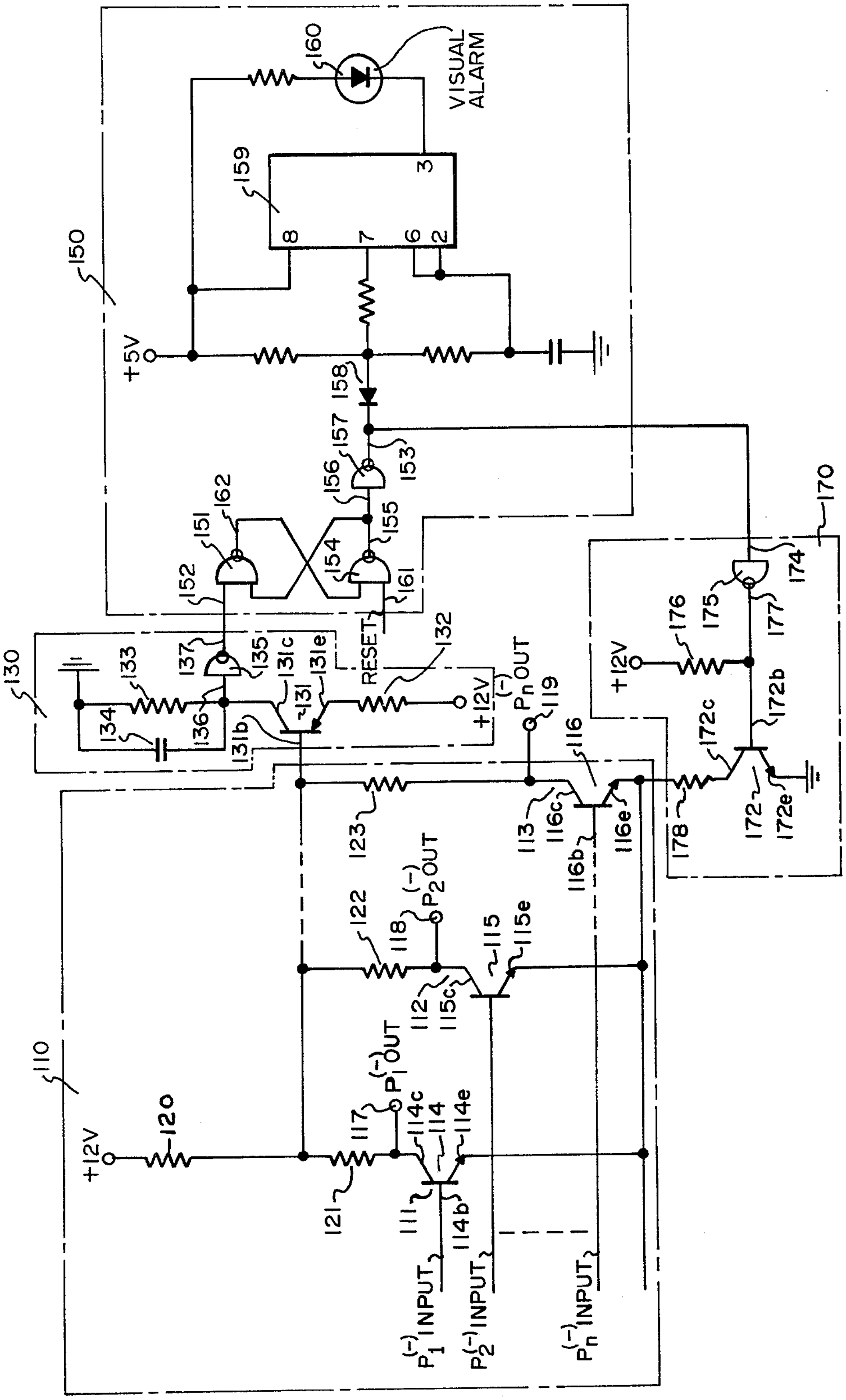
FIG. 2 is a schematic circuit diagram of another type of marking means associated with another form of path marking pulse width monitor embodying the present invention.

FIG. 2 shows a similar circuit comprising marking means 110, detecting means 130, indicating means 150 and path marking pulse terminating means 170. The difference between the circuit of FIG. 2 and the circuit of FIG. 1 is that the circuit of FIG. 2 is adapted for use in those telephone communication networks which require negative pull drivers or in other words low voltage level pulses for establishing a unique transmission path from the matrix of possible transmission paths.

Marking means 110 comprises negative pull drivers 111, 112 and 113. Pull driver 111 comprises transistor 114 and resistor 121. The base **114*b* of transistor 114 is coupled to a NAND gate (not shown) which receives the timing and addressing signals from the telephone communication network. The emitter 114*e* of transistor 114 is coupled to resistor 178 of marking pulse terminating means 170 which is in turn coupled to the collector 172*c* of transistor 172. The emitter 172*e* of transistor 172 is coupled to ground. Resistor 121 couples collector 114*c* of transistor 114 to resistor 120** which is also coupled to a positive 12 volt power source.

Pull driver circuit 112 and pull driver circuit 113 are essentially identical pull driver circuit 111 as shown in the figure. Resistors 122 and 123 of pull driver circuits 112 and 113 respectively are each coupled to resistor 117. The emitters **115*e* and 116*e* of transistors 115 and 116 respectively are each coupled to resistor 178. Each of the pull drivers has an output for applying their path marking pulses to their associated transmission paths, pull driver circuit 111 having output 117, pull driver circuit 112 having output 118, and pull driver circuit 113 having output 119**.

Detecting means 130 comprises transistor 131, resistor 132, resistor 133, capacitor 134 and NAND gate 135. Resistor 132 couples emitter 131e of transistor 131 to a positive 12 volt power source. The collector 131c of transistor 131 is coupled to ground by the parallel combination of capacitor 134 and resistor 133. Collector 131c is additionally coupled to the input 136 of NAND gate 135.

Output 137 of NAND gate 135 is coupled to input 152 of NAND gate 151 of indicating means 150. Output 137 of the pulse duration detecting means 130 provides a control signal to be utilized by indicating means 150.

Indicating means 150 in addition to NAND gate 151 comprises NAND gate 154, NAND gate 157, diode 158, astable multivibrator 159 and light emitting diode 160. As in the embodiment shown in FIG. 1, indicating means 150 has a latching circuit comprising NAND gates 151 and 154. Output 155 of NAND gate 154 is coupled to input 156 of NAND gate 157 which has an output 153 which is coupled to diode 158 and also to the path marking pulse terminating means 170 at input 174 of NAND gate 175. NAND gate 154 of the latching circuit has reset input 161 for resetting the indicating means.

The path marking pulse terminating means 170 in addition to NAND gate 175 and transistor 172 comprises resistor 176 which is coupled to base 172b of transistor 172 and also to output 177 of NAND gate 175.

In operation, and assuming the transmission path associated with output 119 of pull driver 113 is to be selected, transistor 116 is initially in the nonconducting state. The 12 volt source coupled through resistor 176 to base **172*b* of transistor 172 maintains transistor 172 to be normally conducting. When the appropriate address and timing signals are applied to the NAND gate (not shown) coupled to base 116*b* of transistor 116, transistor 116 will be conductive placing output terminal 119 at approximately ground potential through transistor 116, resistor 178 and transistor 172**.

Output terminal 119 by being coupled to base **131*b* of transistor 131 will cause transistor 131 to be forward biased to cause transistor 131 to conduct current to charge capacitor 134. After a predetermined time duration capacitor 134 will be sufficiently charged to cause NAND gate 135 to provide a low level control signal at output 137 to set the latching circuit comprising NAND gates 151 and 154. Because the reset input 161 is normally at a high level, and because a high level will result at output 162 from the low level at input 152 of NAND gate 151, output 155 of NAND gate 154 will go low. This causes output 153 of NAND gate 157 to go high to release the grounding input at diode 158 on multivibrator 159 to allow multivibrator to impress upon light emitting diode 116 a square wave voltage to cause light emitting diode 160** to provide a flashing indication of the marking pulse of excessive duration.

The high level at output 153 of NAND gate 157 will also be impressed upon input 174 of NAND gate 175. This causes output 177 to go low and to back bias transistor 172 causing it to turn off. With transistor 172 nonconducting, output 119 of pull driver circuit 113 will assume a positive potential as seen through resistors 123 and 117 to thus terminate the path marking pulse. Because NAND gates 151 and 154 are interconnected to form a latching circuit, the operation of multivibrator 159 and light emitting diode 160 will be unaffected until input 161 of NAND gate 154 is provided with a reset signal.

Thus, it can be seen that the present invention provides a monitor for monitoring the duration of the path marking pulses in a telephone communication network. Additionally, the monitor of the present invention not only provides a sustained or flashing visual indication of those marking pulses of a duration greater than the predetermined time duration but also provides for terminating the marking pulses of excessive duration after the predetermined time has elapsed to thereby prevent faulty or multiple cross-connections during subsequent path selections.

In both of the embodiments described, the predetermined time duration may be varied by, for example, changing the value of the charging capacitor or varying the amount of current supplied to the charging capacitor during the marking pulse duration. While a 2 microsecond duration has been contemplated, any duration can be utilized.

Finally, as shown in the embodiment of FIG. 1, the defective marking means may be specifically addressed by the telephone communication network to aid in the location of the faulty marking means. This substantially reduces servicing time and also provides useful data which may be stored in a computer for subsequent reference.

While particular embodiments of the invention have been shown and described, modifications may be made, and it is intended in the appended claims to cover all such modifications as may fall within the spirit and scope of the invention.

We claim:

1. A path marking pulse width monitor for use in a telephone communication network of the type wherein unique transmission paths are selected from a matrix of possible transmission paths by marking pulses provided by path marking means, said path marking pulse width monitor comprising:

pulse duration detecting means coupled to the marking means and responsive to one of the marking pulses exceeding a predetermined time duration for providing an output control signal;

visual indicating means coupled to said detecting means responsive to said output control signal for indicating the presence of the pulse having a duration exceeding said predetermined time duration; and pulse terminating means coupled to said marking means and responsive to said control signal for permanently terminating a marking pulse of excessive duration when said predetermined time has elapsed and preventing transmission of any subsequent marking pulse;

whereby said visual indicating means remains in operation and said pulse terminating means continues to prevent a second path marking pulse from being transmitted until the proper servicing is completed and a reset signal is applied to said indicating means.

2. A pulse width monitor in accordance with claim 1 wherein said pulse duration detecting means comprises a NAND gate, a capacitor and a transistor having a collector, a base and an emitter, said capacitor being coupled to said collector, said emitter being coupled to a power source, said base being coupled to said marking means, and an input of said NAND gate being coupled to the junction of said collector and said capacitor whereby, when the marking pulse is sustained for said predetermined time duration, said transistor charges said capacitor to a voltage sufficient to cause said NAND gate to provide at its output said control signal.

3. A pulse width monitor in accordance with claim 1 wherein said indicating means includes latching means for providing a sustained indication of the marking pulse of excessive duration.

4. A pulse width monitor in accordance with claim 3 wherein said indicating means additionally includes a light emitting diode coupled to said latching means for providing a sustained visual indication of the marking pulse of excessive duration.

5. A pulse width monitor in accordance with claim 3 wherein said indicating means additionally comprises an addressable alarm means coupled to said latching means for providing an addressable logic alarm to enable the locating of the marking means which is providing the marking pulse of excessive duration.

6. A pulse width monitor in accordance with claim 3 wherein said latching means includes a reset input.

7. A pulse width monitor in accordance with claim 3 wherein said indicating means further includes a multivibrator and a light emitting diode, said diode being coupled to said multivibrator and said multivibrator being coupled to said latching means for providing a flashing visual indication of the marking pulse of excessive duration.

8. A path marking pulse width monitor for use in a telephone communication network of the type wherein unique transmission paths are selected from a matrix of possible transmission paths by marking pulses provided by a marking means, said path marking pulse width monitor comprising:

pulse duration detecting means coupled to the marking means and responsive to one of the marking pulses exceeding a predetermined time duration for providing an output control signal;

visual indicating means including a latching circuit coupled to said detecting means responsive to said output control signal for providing a sustained visual indication of the presence of the pulse having a duration exceeding said predetermined time duration; and pulse terminating means coupled to the marking means and responsive to said control signal for terminating the marking pulse of excessive duration when said predetermined time has elapsed; whereby a marking pulse of excessive duration causes said detecting means to provide said indicating means with said control signal to thereby cause said indicating means to indicate the presence of said pulse of excessive duration and said terminating means terminates said pulse when said predetermined time duration has elapsed to prevent faulty path selection with those transmission paths associated with said marking means.

* * * * *